United States Patent
Yu et al.

(10) Patent No.: US 9,353,259 B2
(45) Date of Patent: May 31, 2016

(54) METHOD FOR PRODUCING THERMOPLASTIC RESIN COMPOSITION

(71) Applicant: Konica Minolta, Inc., Tokyo (JP)

(72) Inventors: Yiqiang Yu, Hachioji (JP); Masashi Mamino, Mitaka (JP); Ryuji Kitani, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/540,711

(22) Filed: Nov. 13, 2014

(65) Prior Publication Data

US 2015/0141560 A1    May 21, 2015

(30) Foreign Application Priority Data

Nov. 18, 2013 (JP) ................................. 2013-238115

(51) Int. Cl.
| | |
|---|---|
| C10C 3/02 | (2006.01) |
| C08L 67/02 | (2006.01) |
| C08J 3/00 | (2006.01) |
| C08J 3/20 | (2006.01) |
| C08L 69/00 | (2006.01) |

(52) U.S. Cl.
CPC .. *C08L 67/02* (2013.01); *C08J 3/00* (2013.01); *C08J 3/005* (2013.01); *C08J 3/20* (2013.01); *C08J 3/203* (2013.01); *C08L 69/00* (2013.01); *C08J 2367/00* (2013.01); *C08J 2367/02* (2013.01); *C08J 2369/00* (2013.01); *C08L 2201/02* (2013.01)

(58) Field of Classification Search
CPC .............................. C08L 67/02; C08L 2201/02
See application file for complete search history.

(56) References Cited

U.S. PATENT DOCUMENTS

| | | | | |
|---|---|---|---|---|
| 4,929,665 | A * | 5/1990 | Inoue | C08G 75/0236 523/435 |
| 2008/0242783 | A1 * | 10/2008 | Ganesan | C08G 63/19 524/413 |
| 2009/0203819 | A1 | 8/2009 | Jung et al. | |
| 2013/0317149 | A1 * | 11/2013 | Zhao | C08L 67/04 524/127 |
| 2014/0296383 | A1 * | 10/2014 | Xin | C08K 5/0066 523/435 |

FOREIGN PATENT DOCUMENTS

| | | |
|---|---|---|
| CN | 101309966 A | 11/2008 |
| JP | 2012-136558 A | 7/2012 |

OTHER PUBLICATIONS

Office Action issued Jan. 14, 2016; Application No. or Patent No. 201410655076.8; Applicant: Konica Minolta, Inc.; Title of the Invention: Method for Producing Thermoplastic Resin Composition; total of 10 pages; English translation of The First Office Action; total of 12 pages; Grand Total of 22 pages.

* cited by examiner

*Primary Examiner* — Hannah Pak
(74) *Attorney, Agent, or Firm* — Lucas & Mercanti, LLP

(57) ABSTRACT

Provided is a thermoplastic resin composition having high flame resistance and high fluidity during injection molding, and improved impact resistance in a molded article. A method for producing a thermoplastic resin composition, the method including the step (1) of obtaining a polyester resin mixture by melt-kneading 50 to 80 parts by weight of crystalline polyester resin and 20 to 50 parts by weight of amorphous polyester resin with an extruder, and the step (2) of mixing the polyester resin mixture, a polycarbonate resin, a flame retardant, a dripping inhibitor and a toughening agent, wherein the cylinder temperature of the extruder is 250 to 280° C.

5 Claims, No Drawings

METHOD FOR PRODUCING THERMOPLASTIC RESIN COMPOSITION

CROSS-REFERENCE TO RELATED APPLICATION

This application is based on Japanese Patent Application No. 2013-238115 filed on Nov. 18, 2013, the contents of which are incorporated herein by reference.

BACKGROUND

1. Technical Field

The present invention is a method for producing a thermoplastic resin composition.

2. Description of Related Art

Thermoplastic resins such as polycarbonate resins and polyester resins, and resin compositions thereof have been presently used in a wide range of fields as molding materials for containers, wrapping films, home appliances, office automation equipment, audiovisual equipment, electrical and electronics parts and automobile parts and the like in terms of excellent molding processability, mechanical properties, heat resistance, weather resistance, appearances, hygienic properties, economical efficiency and the like.

The resin molded articles used for these purposes are required to have flame resistance. In order to impart flame resistance to thermoplastic resins, it is generally known that a flame retardant is added to the resins (see e.g. Japanese Patent Application Laid-Open No. 2012-136558).

In recent years, laws such as "The Low for Promotion of Sorted Collection and Recycling of Containers and Packaging (The Containers and Packaging Recycling Law)" and "Law Concerning the Promotion of Procurement of Eco-Friendly Goods and Services by the State and Other Entities (Law on Promoting Green Purchasing)" have been executed in succession, and thus there is an increasing interest in such thermoplastic resins and a material recycle technology for the molded products of resin compositions thereof. In particular, it is urgent to establish a material recycle technology for polyethylene terephthalate (hereinafter, also referred to as "PET") bottles using PET resin, the usage of which has been rapidly increased, as a material. In addition, with the growth of optical recording medium products (optical disks) using a polycarbonate (hereinafter, also referred to as "PC") resin as a material such as CD, CD-R, DVD and MD, a method for reusing mill ends discharged during the molding process thereof, and a method for reusing a polycarbonate resin obtained after a reflection layer and a recording layer and the like are exfoliated from an optical disk, which becomes waste, have been examined.

When resins obtained by pulverizing molded products of crystalline polyester resins typified by PET resin such as used PET bottles retrieved from the market or PC resins such as optical disks are molded again, in particular when the resins are molded again by an injection molding method, high fluidity during molding is required as the characteristics of resins in order that the resins can be applied to various molded bodies.

Further, when in a resin composition, a polyester resin and a polycarbonate resin are used for as component members for home appliances, office automation equipment and the like, high impact strength is required.

SUMMARY

In a system in which a polyester resin and a polycarbonate resin are melt-mixed, however, it has been difficult to obtain both fluidity during molding and the impact resistant characteristics of a molded article.

The present invention is made in view of the above circumstances, and an object thereof is to provide a method for producing a thermoplastic resin composition including a crystalline polyester resin and a polycarbonate resin, wherein the resin composition has high flame resistance as well as high fluidity during injection molding, and further high impact strength in a molded article.

To achieve at least one of the abovementioned objects, the production method reflecting one aspect of the present invention includes the step (1) of obtaining a polyester resin mixture by melt-kneading 50 to 80 parts by weight of crystalline polyester resin and 20 to 50 parts by weight of amorphous polyester resin with an extruder, and the step (2) of mixing the polyester resin mixture, a polycarbonate resin, a flame retardant, a dripping inhibitor and a toughening agent, wherein the cylinder temperature of the extruder is 250 to 280° C.

In the above-mentioned production method, it is desired that the amount of heat release ($\Delta H_A$) in the DSC melting curve of the polyester resin mixture be 70% or less with respect to the amount of heat release ($\Delta H_B$) in the DSC melting curve of the crystalline polyester resin ($\Delta H_A/\Delta H_B \leq 0.7$).

In the above-mentioned production method, it is desired that the crystalline polyester resin be at least one of polyethylene terephthalate and polybutylene terephthalate, and the amorphous polyester resin be at least one of PETG resin, PCTG resin and PCTA resin.

In the step (1) of the above-mentioned production method, it is desired that a metal-based catalyst be added in an amount of 0.05 weight % or less with respect to a total of 100 weight % of the crystalline polyester resin and the amorphous polyester resin.

In the step (2) of the above-mentioned production method, it is desired that 10 to 90 parts by weight of polyester resin mixture, 10 to 90 parts by weight of polycarbonate resin, 1 to 40 parts by weight of flame retardant, 0.1 to 1 part by weight of dripping inhibitor and 1 to 20 parts by weight of toughening agent be mixed.

In the above-mentioned production method, it is desired that the molecular weight (Mw) of the polycarbonate resin be 20,000 to 70,000.

The objects, features, and characteristics of this invention other than those set forth above will become apparent from the description given herein below with reference to preferred embodiments.

DETAILED DESCRIPTION

Hereinafter, the embodiments of the present invention will be described.

The first embodiment of the present invention is a method for producing a thermoplastic resin composition, the method including the step (1) of obtaining a polyester resin mixture by melt-kneading 50 to 80 parts by weight of crystalline polyester resin and 20 to 50 parts by weight of amorphous polyester resin with an extruder, and the step (2) of mixing the polyester resin mixture, a polycarbonate resin, a flame retardant, a dripping inhibitor and a toughening agent, wherein the cylinder temperature of the extruder is 250 to 280° C.

The first embodiment is characterized by, after preliminarily melt-kneading a crystalline polyester resin and an amorphous polyester resin, adding other constituents such as a flame retardant, and also at this time, characterized in that the cylinder temperature of the extruder is 250 to 280° C.

As described above, when a crystalline polyester resin such as PET is tried to be molded again by recycling, it has been difficult to obtain both fluidity characteristics during molding and the impact resistance of a molded article.

The present inventors supposed that, as a reason why fluidity decreases when using a crystalline polyester resin, the crystallization of the crystalline polyester resin had a bad influence upon fluidity and impact resistance.

Therefore, as a result of intensive studies, it was found that by, after melt-kneading crystalline polyester and amorphous polyester, melt-mixing other components, both fluidity and impact resistance could be obtained.

When a crystalline polyester resin and an amorphous polyester resin are melt-kneaded together with other addition components (without primary kneading), both the fluidity of the resin and improvement in impact resistance cannot be obtained (see Comparative Example 1 described below). It is believed that this is due to that transesterification does not efficiently occur because the chance of the reaction of crystalline polyester and amorphous polyester decreases when the polyesters are added together with a polycarbonate resin and the like and melt-mixed.

A detailed mechanism in which in the thermoplastic resin composition obtained by the production method in the first embodiment, both fluidity and impact resistance are improved is unclear, but it is believed that by melt-kneading a crystalline polyester resin and an amorphous polyester resin at an appropriate temperature, the molecular chains of the crystalline polyester resin and the amorphous polyester resin are cut and transesterification by which mutual molecular chains are exchanged occurs and the crystallization of the crystalline polyester resin is inhibited. When the crystallinity degree of a crystalline polyester resin is high, that is to say, molecular chains in a crystal are tightly arranged, it is easy to break when impact is taken. It is believed that by inhibiting the crystallization of a crystalline polyester resin, the crystalline state is changed into the amorphous state at room temperature and molecular chains are easily transformed and thus impact resistance is improved.

In addition, when the crystallinity of the resin is high, crystallization occurs in a die and the like in the molding process and then viscosity increases, and thus fluidity decreases in a die and the like. It is believed that by inhibiting the crystallization of the crystalline polyester resin, the fluidity of the resin can be high.

Further, by making the constitution of the first embodiment, both the above-mentioned impact resistance and high fluidity, and high flame resistance are also maintained.

That is, by preliminarily melt-kneading crystalline polyester and amorphous polyester, a resin composition satisfying both improvements in flame resistance and high fluidity can be obtained. In addition, by preliminarily melt-kneading crystalline polyester and amorphous polyester, the impact resistance of a molded article of a resin composition can be improved.

Therefore, the thermoplastic resin composition obtained by the production method in the first embodiment can be used as a part for various purposes such as office equipment, information-telecommunications equipment, electrical and electric equipment and consumer electronics which have complicated structures. In addition, even when recycled resins such as polyester resins and polycarbonate resins, which are obtained from retrieved molded products and mill ends during molding process and the like, are used, a resin composition with excellent flame resistance and excellent mechanical strength such as the modulus of elasticity, flexural strength and shock resistant strength and a molded body can be obtained.

Each step will be now described.

(Step (1))

In the step (1), a polyester resin mixture is obtained by melt-kneading 50 to 80 parts by weight of crystalline polyester resin and 20 to 50 parts by weight of amorphous polyester resin with an extruder. In this case, it is preferred that the crystalline polyester resin be 50 to 80 parts by weight and the amorphous polyester resin be 20 to 50 parts by weight with respect to a total of 100 parts by weight of crystalline polyester resin and amorphous polyester resin.

Before the melt-kneading treatment, the preliminary mixing treatment which preliminarily mixes an amorphous polyester resin and a crystalline polyester resin can be performed. The mixers used for preliminary mixing include mixers such as a V type mixer, a ribbon mixer, a Nauta mixer and a Super mixer. In addition, it is preferred that the mixture be sufficiently dried before the melt-kneading treatment after the preliminary mixing treatment from the viewpoint that the hydrolysis reaction of a thermoplastic polyester resin is inhibited. The drying temperature at this time is not particularly limited and is preferably 70 to 100° C. In addition, the drying time is not particularly limited, and is preferably 2 to 6 hours. Further, because drying more easily progresses, drying under reduced pressure is preferred.

Melt-kneading is performed with an extruder. For melt-kneading, a multiaxial kneading extruder is preferably used because high shear properties can be imparted and transesterification easily progresses, and a biaxial kneading extruder is more preferably used.

The cylinder temperature of an extruder is 250 to 280° C. during melt-kneading. When the cylinder temperature is below 250° C., the transesterification reaction between a crystalline polyester resin and an amorphous polyester resin does not sufficiently occur, and fluidity decreases. In addition, when the temperature is above 280° C., it is feared that polyester resins may be decomposed, and impact resistance decreases. The mixing pressure is not particularly limited and is preferably 1 to 20 MPa.

The cylinder temperature of an extruder herein indicates, when several temperatures are set in the cylinder of the extruder, the highest temperature in the cylinder part.

The discharge amount from an extruder during melt-kneading is not particularly limited, and is preferably from 10 to 100 kg/h and more preferably from 20 to 70 kg/h because melt-kneading is sufficiently performed and transesterification easily progresses.

It is preferred that the amount of heat release ($\Delta H_A$) in the DSC melting curve of the polyester resin mixture obtained in the step (1) be 70% or less with respect to the amount of heat release ($\Delta H_B$) in the DSC melting curve of the crystalline polyester resin ($\Delta H_A/\Delta H_B \leq 0.7$). The $\Delta H_A/\Delta H_B$ is an index indicating the degree of transesterification, and fluidity is further improved by being $\Delta H_A/\Delta H_B \leq 0.7$. The $\Delta H_A/\Delta H_B$ is more preferably 0.5 or less. The lower limit of $\Delta H_A/\Delta H_B$ is not particularly limited and is generally 0 or more.

In the present description, a DSC melting curve is a curve obtained by making the DSC measurement using DSC6220 (model number) manufactured by Seiko Instruments Inc. under the temperature program in which a sample is maintained at 30° C. for 3 minutes, then heated at a temperature increasing rate of 5° C./min to 280° C., and maintained at 280° C. for 5 minutes, followed by deleting the heat history, and then cooled at a temperature decreasing rate of 20° C./min to 30° C. The $\Delta H$ is a PEAK area obtained from 220° C. to 100° C. in the temperature decreasing process.

A polyester resin mixture is obtained by melt-kneading 50 to 80 parts by weight of crystalline polyester resin and 20 to 50 parts by weight of amorphous polyester resin. When the amorphous polyester resin is above 50 parts by weight, the flame resistance of a resin composition decreases. In addition, when the amorphous polyester resin is below 20 parts by weight, the crystallization of the crystalline polyester resin cannot be inhibited.

The polyester resin kneaded mixture in the molten state obtained by melt-kneading as mentioned above is preferably subjected to cooling treatment after injected. The cooling treatment is not particularly limited, and, for example, a water cooling method in which the above-mentioned polyester resin kneaded mixture is immersed in 0 to 60° C. water, a cooling method using −40 to 60° C. gas, and a method in which the kneaded mixture is brought into contact with −40 to 60° C. metal, and the like can be used.

In addition, it is preferred that the mixture be sufficiently dried before the step (2) described below for the viewpoint that the hydrolysis reaction of a thermoplastic polyester resin is inhibited. The drying temperature at this time is not particularly limited and is preferably from 70 to 100° C. In addition, the drying time is not particularly limited and is preferably from 2 to 6 hours. Further, because drying more easily progresses, drying under reduced pressure is preferred.

(Crystalline/Amorphous Polyester Resins)

The crystalline/amorphous polyester resins used to obtain a mixture are not particularly limited, and are preferably aromatic polyester with a structure in which an aromatic dicarboxylic acid or an ester derivative component thereof and a diol component such as an aliphatic diol or an alicyclic diol are linked by an ester reaction. As the polyester resins, for example, those obtained by polycondensation of an aromatic dicarboxylic acid or an ester derivative component thereof and an aliphatic diol or an alicyclic diol or the like by a well-known method can be used.

Examples of aromatic dicarboxylic acids include, but particularly not limited thereto, terephthalic acid, isophthalic acid, orthophthalic acid, 1,5-naphthalenedicarboxylic acid, 2,5-naphthalenedicarboxylic acid, 2,6-naphthalenedicarboxylic acid, 2,2'-biphenyldicarboxylic acid, 3,3'-biphenyldicarboxylic acid, 4,4'-biphenyldicarboxylic acid, 4,4'-diphenyl ether dicarboxylic acid, 4,4'-diphenylmethane dicarboxylic acid, 4,4'-diphenyl sulfone dicarboxylic acid, 4,4'-diphenylisopropylidene dicarboxylic acid, 1,2-bis(phenoxy)ethane-4,4'-dicarboxylic acid, 2,5-anthracene dicarboxylic acid, 2,6-anthracene dicarboxylic acid, 4,4'-p-terphenylenedicarboxylic acid and 2,5-pyridinedicarboxylic acid and the like.

Examples of aliphatic diols include ethylene glycol, propylene glycol, butylene glycol, hexylene glycol, neopentyl glycol, 2-methyl-1,3-propanediol, diethylene glycol and triethylene glycol and the like. As alicyclic diols, 1,4-cyclohexanedimethanol and the like are mentioned.

About these aromatic dicarboxylic acids and aliphatic diols or alicyclic diols, the respective above-mentioned compounds can be used alone or two or more types of respective compounds can be used in combination. Further, the polyester resins constituting the resin composition of the present invention can have a structure component derived from a monomer with three or more functional groups such as glycerin, trimethylolpropane, pentaerythritol, trimellitic acid and pyromellitic acid only when the amount is 1 mol % or less based on the whole structure unit.

The crystalline polyester resins means resins having not a stepped endothermic change but a clear endothermic peak in differential scanning calorimetry (DSC) among the above-mentioned polyester resins. The clear endothermic peak specifically means a peak in which, when a measurement is made at a temperature increasing rate of 10° C./min in differential scanning calorimetry (DSC) described in the method for measuring the endothermic peak temperature of a crystalline polyester resin in an example, the half-value width of an endothermic peak is within 15° C.

The crystalline polyester resins are not particularly limited, as long as they are as defined above. About a resin with a structure in which other components are copolymerized with the main chain of a crystalline polyester resin, for example, when this resin shows a clear endothermic peak as mentioned above, this corresponds to the crystalline polyester resin in the present invention.

Specific examples of the crystalline polyester resins include polyethylene terephthalate, polypropylene terephthalate, polybutylene terephthalate, polyethylene naphthalate, polypropylene naphthalate, polybutylene naphthalate and the like. The crystalline polyester resin is preferably at least one of polyethylene terephthalate and polybutylene terephthalate because they are widely used and are easily recycled to resins with high fluidity and high impact resistance by the method of the present invention.

The crystalline polyester resins can be used alone or two or more crystalline polyester resins can be used in combination.

The intrinsic viscosity of the crystalline polyester resin is not particularly limited and is in the range of preferably from 0.4 to 1.5 dl/g, more preferably from 0.4 to 1.2 dl/g, and further preferably from 0.7 to 1.0 dl/g in view of impact resistance and fluidity. The intrinsic viscosity is a value measured using a phenol/tetrachloroethane (mass ratio: 1/1) mixed solvent at 30° C. according to JIS K7367-5 (2000).

As the crystalline polyester resins, resin pieces obtained by pulverizing disposed polyester resin products can be used. In particular, as PET with an intrinsic viscosity within the above-mentioned range, the pulverized products of PET products such as used PET bottles which are disposed can be also suitably used. Bottles, sheets and clothes which are PET products retrieved as waste, and molding waste and fiber waste and the like generated when these molded articles are molded are pulverized into a proper size, and the obtained resin pieces can be used. Among these, the pulverized products of drinking bottles, which are quantitatively large, can be suitably used. In general, PET bottles are recycled into transparent clear flakes with a size of 5 to 10 mm by undergoing separate collection and then the steps of removing different materials, pulverizing and washing. Generally, the instinct viscosity of such clear flakes is approximately in the range of 0.60 to 0.80 dl/g.

The polyester resin pieces of disposed polyester resin products can be also obtained by pulverizing, washing and drying, and then temporary kneading at a temperature of 180° C. or more and 260° C. or less, and cooling and pulverizing. Virgin (unused) polyester resins are put on the market in the form of pellet, and these are pressed at a temperature equal to or higher than the glass transition temperature, or temporarily melted with an extruder or the like, and a molten strand is squeezed by passing through a roller in a coolant and is, for example, cut with a general pelletizer, and thus the resins can be used as resin pieces.

By using resin pieces of polyester resins, the supply to a kneading device is facilitated in the production of a resin composition, and the load to the kneading device during kneading until melting is reduced. As the form of polyester resin pieces, preferred are, for example, the flake form, the block form, the powder form, the pellet form and the like, and particularly preferred is the pellet form. The maximum length of resin pieces is preferably 30 mm or less, more preferably 20 mm, and further preferably 10 mm or less. Even when resin pieces with a maximum length of above 30 mm are contained, kneading can be performed, but clogging can occur in the supply process, which is not preferred. However, the clogging can be prevented by improving a supply device, and thus the length of resin pieces is not particularly limited as long as the object of the present invention is impaired.

The amorphous polyester resins are polyester resins other than the above-mentioned crystalline polyester resins. That is, the amorphous polyester resins are generally those which do not have a melting point and have a relatively high glass transition point temperature (Tg). More specifically, the glass transition temperature (Tg) is preferably from 40 to 90° C., and particularly preferably from 45 to 85° C. The glass transition temperature (Tg) is measured by a method described in the method for measuring the glass transition temperature (Tg) of an amorphous polyester resin in an example.

The amorphous polyester resins are preferably copolymers having at least terephthalic acid, ethylene glycol and 1,4-cyclohexanedimethanol (CHDM) as monomer components, and specifically includes PETG resin, PCTG resin (polycyclohexylenedimethylene terephthalate, ethylene glycol of PET is partially substituted with CHDM), PCTA resin (a copolymer including terephthalic acid, isophthalic acid, ethylene glycol and CHDM, a resin in which the acid component of PCTG resin is partially substituted with isophthalic acid), and the like.

In the present invention, when the diol component (ethylene glycol) of polyethylene terephthalate (PET) is substituted with 1,4-cyclohexanedimethanol (CHDM), a resin in which the proportion of substitution with CHDM is 0.0001 mol % or more and below 50 mol % is referred to as PETG resin, and a resin in which the proportion is 50 mol % or more and 100 mol % or less is referred to as PCTG resin (cyclohexane dimethylene terephthalate).

As the PETG resin, products which are produced and distributed from Eastman Chemical Company, USA, and SKYGREEN and the like are preferably used. As the PETG resin, product names: Eastar Copolyester GN-071 and Eastar Copolyester 6763 of Eastman Chemical Company, USA, and the like are mentioned. As the PCTG resin, product name: Eastar Copolyester DN-001 of Eastman Chemical Company, USA, and the like are mentioned.

The PCTA resin is a thermoplastic saturated copolyester obtained by polycondensation of 1,4-cyclohexanedimethanol, and terephthalic acid and isophthalic acid. As the PCTA resin, product name: KODAR THERM X6761, Eastar AN-004 of Eastman Chemical Company, USA and the like are mentioned.

The amorphous polyester resins can be used alone or two or more amorphous polyester resins can be used in combination.

In the present embodiment, it is preferred that the crystalline polyester resin be at least one of polyethylene terephthalate and polybutylene terephthalate, and the amorphous polyester resin be at least one of PETG resin, PCTG resin and PCTA resin. This is preferred because these resins have structures similar to each other and have SP values close to each other and thus compatibility is high and transesterification easily occurs. It is believed that using polyethylene terephthalate/polybutylene terephthalate as the crystalline polyester resin and PETG resin/PCTG resin/PCTA resin as the amorphous polyester resin, the CHDM group in the amorphous polyester resin is introduced into the crystalline polyester resin to cause transesterification.

(Metal-Based Catalyst)

It is preferred that in the step (1), a metal-based catalyst be added in an amount of 0.05 weight % or less with respect to a total of 100 weight % of the crystalline polyester resin and the amorphous polyester resin. By adding a metal-based catalyst, the transesterification reaction of a crystalline polyester resin and an amorphous polyester resin is promoted and the reaction proportion is then increased, which is preferred. In addition, when the amount of metal-based catalyst added is 0.05 weight % or less with respect to a total of 100 weight % of the resins, the decomposition of the resins is difficult to occur, which is preferred. More preferably, the amount of metal-based catalyst added when a metal-based catalyst is added, is from 0.001 to 0.05 weight % with respect to 100 weight % of polyester resins (the sum of crystalline/amorphous polyester resins).

The above-mentioned metal-based catalyst is not particularly limited and is preferably a catalyst containing a metal selected from the group consisting of La, Ti and Zn. Specifically, the catalysts include lanthanum (III) acetylacetonate hydrate (the formula (1) given below), zinc acetate (the formula (2) given below), titanium (IV) oxydiacetylacetonate (the formula (3) given below) and the like.

[Chem. 1]

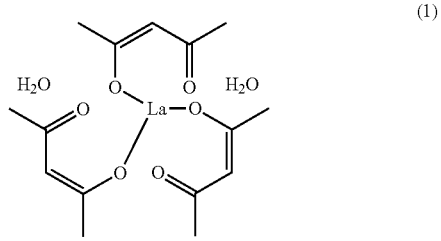

(1)

[Chem. 2]

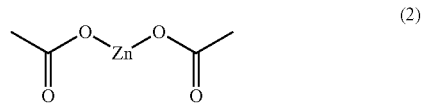

(2)

[Chem. 3]

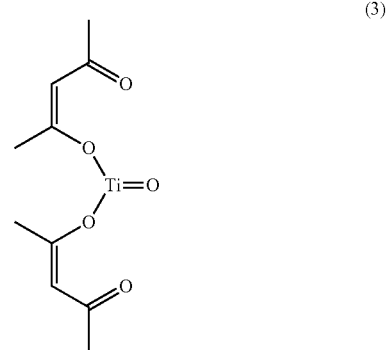

(3)

The adding time of a metal-based catalyst is preferably before melt-mixing, and is not particularly limited as long as it is before melt-mixing. A crystalline polyester resin, an amorphous polyester resin and a metal-based catalyst can be added together and then melt-mixed, or a metal-based catalyst is added to either a crystalline polyester resin or an amorphous polyester resin and then another polyester resin is added thereto, and the obtained mixture can be melt-mixed, or a crystalline polyester resin and an amorphous polyester resin are mixed preliminarily and a metal-based catalyst is then added thereto, and the obtained mixture can be melt-mixed.

(Step (2))

In the step (2), the polyester resin mixture obtained in the step (1), a polycarbonate resin, a flame retardant, a dripping inhibitor and a toughening agent are mixed. The mixing is preferably melt-kneading.

The preliminary mixing treatment in which components to be mixed are preliminarily mixed can be performed before the melt-kneading treatment. As a mixer used for preliminary mixing, mixers such as a V type mixer, a ribbon mixer, a Nauta mixer and a Super mixer are mentioned.

The melt-kneading can be performed using a Banbury mixer, a roller and a uniaxial or multiaxial extruder and the like, and is preferably performed by a biaxial extruder. The melt-kneading conditions are not particularly limited, and, for example, the cylinder temperature during melt-kneading is preferably in the range of 240 to 300° C., and more preferably the range of 250 to 280° C. The kneading pressure is not particularly limited, and is preferably from 1 to 20 MPa.

The discharge amount from an extruder during melt-kneading is not particularly limited, and is preferably from 10 to 100 kg/h and more preferably from 20 to 70 kg/h because melt-kneading is sufficiently performed.

The kneading proportion of a polycarbonate resin and a polyester resin mixture is preferably from 70 to 2 parts by weight of polyester resin mixture to from 30 to 98 parts by weight of polycarbonate resin.

In addition, the amount of each component added in the step (2) is not particularly limited, and it is preferred that 10 to 90 parts by weight of polyester resin mixture, 10 to 90 parts by weight of polycarbonate resin, 1 to 40 parts by weight of flame retardant, 0.1 to 1 part by weight of dripping inhibitor and 1 to 20 parts by weight of toughening agent be mixed in view of impact resistance, fluidity and flame resistance. In this case, it is more preferred that the components be blended so that the sum total of the polyester resin mixture and the polycarbonate resin will be 100 parts by weight.

The resin kneaded mixture in the molten state obtained by melt-kneading as mentioned above is preferably subjected to cooling treatment after injected. The cooling treatment is not particularly limited, and, for example, a water cooling method in which the above-mentioned resin kneaded mixture is immersed in 0 to 60° C. water, a cooling method using −40 to 60° C. gas, and a method in which the kneaded mixture is brought into contact with −40 to 60° C. metal, and the like can be used.

The resin composition thus obtained is preferably cut by, for example, a pelletizer to obtain pellets in order to facilitate treatment during injection molding by an injection molding method.

(Polycarbonate Resin)

The polycarbonate resin can be an aromatic homo- or copolycarbonate resin obtained by the reaction of an aromatic divalent phenol compound and phosgene or a carbonate diester. The method for producing such polycarbonate resin is not particularly limited, and well-known methods can be adopted, and examples thereof include a method in which an aromatic divalent phenol compound is directly reacted with phosgene and the like (an interfacial polymerization method), a method in which an aromatic divalent phenol compound and a carbonate diester such as diphenyl carbonate are trans-esterified in the molten state (a solution method), and the like.

The weight average molecular weight of the polycarbonate resin is preferably 20,000 to 70,000. This is preferred because, when the weight average molecular weight of the polycarbonate resin is 20,000 or more, impact resistance is further improved, and, when the weight average molecular weight thereof is 70,000 or less, high fluidity is obtained. More preferably, the weight average molecular weight of the polycarbonate resin is 30,000 to 55,000. The weight average molecular weight is measured by the measurement method described in an example mentioned below. According to the production method in the present embodiment, the crystallization of a crystalline polyester resin is inhibited, and thus impact resistance is secured even when using a polycarbonate resin with a relatively low molecular weight (e.g. the weight average molecular weight is approximately 20,000 to 45,000), in which impact resistance decreases in a system where a general crystalline polyester resin and such polycarbonate resin are used in combination. In addition, according to the production method in the present embodiment, the crystallization of a crystalline polyester resin is inhibited, and thus high fluidity is secured even when using a polycarbonate resin with a relatively high molecular weight (e.g. the weight average molecular weight is approximately 40,000 to 70,000), in which fluidity decreases in a system where a general crystalline polyester resin and such polycarbonate resin are used in combination.

Examples of aromatic divalent phenol compounds include 2,2-bis(4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-diphenyl)butane, 2,2-bis(4-hydroxy-3,5-diethylphenyl)propane, 1,1-bis(4-hydroxyphenyl)cyclohexane, and 1-phenyl-1,1-bis(4-hydroxyphenyl)ethane and the like, and these can be used alone or as a mixture.

As the carbonate diesters, for example, diaryl carbonates such as diphenyl carbonate, ditolyl carbonate and bis(chlorophenyl)carbonate, dialkyl carbonates such as dimethyl carbonate and diethyl carbonate, carbonyl halides such as phosgene, haloformates such as dihaloformates of a divalent phenol, and the like can be used, but not limited thereto. Among these, preferred is diphenyl carbonate. In addition, these carbonate diesters can be used alone or two or more carbonate diesters can be used in combination.

The polycarbonate resin can be, for example, a branched polycarbonate resin in which a multifunctional aromatic compound having three or more functional groups, such as 1,1,1-tris(4-hydroxyphenyl)ethane or 1,1,1-tris(3,5-dimethyl-4-hydroxyphenyl)ethane, is copolymerized, or a polyester carbonate resin in which an aromatic or aliphatic bifunctional carboxylic acid is copolymerized. In addition, the polycarbonate resin can be a mixture obtained by mixing two or more types of the obtained polycarbonate resins.

As the polycarbonate resins, resin pieces obtained by pulverizing disposed polycarbonate resin products can be used. In particular, as polycarbonate within the above-mentioned range of molecular weight, the pulverized products of disposed optical disks and the like can be also suitably used. Optical disks such as CD, CD-R, DVD and MD, and mill ends generated during the molding process of optical lens, and a resin obtained by exfoliating a reflection layer, recording layer and the like from an optical disk, which becomes waste, and the like are pulverized into a proper size with 10 mm or less, and the obtained resin pieces are not particularly limited and can be used in the present invention. The polycarbonate resin pieces of disposed polycarbonate resin products can be obtained by pulverizing and washing and temporary kneading at a temperature of 180° C. or more and 260° C. or less, and cooling and pulverizing.

Virgin (unused) polycarbonate resins are put on the market in the form of pellet, and these are pressed at a temperature equal to or higher than the glass transition temperature, or temporarily melted with an extruder or the like, and a molten strand is squeezed by passing through a roller in a coolant and is, for example, cut with a general pelletizer, and thus the resins can be used as resin pieces.

By using resin pieces of polycarbonate resins, the supply to a kneading device is facilitated in the production of a resin composition, and the load to the kneading device during kneading until melting is reduced. As the form of polycarbonate resin pieces, preferred are, for example, the flake form, the block form, the powder form, the pellet form and the like, and particularly preferred is the flake form. The maximum length of resin pieces is preferably 30 mm or less, more preferably 20 mm or less, and further preferably 10 mm or less. Even when resin pieces with a maximum length of above 30 mm are contained, kneading can be performed, but clogging can occur in the supply process, which is not preferred. However, the clogging can be prevented by improving a supply device, and thus the length of resin pieces is not particularly limited as long as the object of the present invention is not impaired.

(Flame Retardant)

The flame retardant can be an organic flame retardant or an inorganic flame retardant. Examples of organic flame retardants include bromine compounds and phosphorus compounds. Examples of inorganic flame retardants include antimony compounds and metal hydroxides.

At least a part of the flame retardant is preferably a phosphorus compound. This is because phosphorus compounds easily impart high flame resistance to a resin composition and do not have environmental toxicity. The phosphorus compounds are typically phosphate ester compounds; examples of phosphate ester compounds include phosphite esters, phosphate esters and esterified compounds of phosphonic acid, and the like. Particularly preferred are phosphate esters.

Specific examples of phosphite esters include triphenyl phosphite, tris(nonylphenyl)phosphite, tris(2,4-di-t-butylphenyl)phosphite, distearyl pentaerythritol diphosphite, bis(2,6-di-t-butyl-4-methylphenyl)pentaerythritol diphosphite, bis(2,4-di-t-butylphenyl)pentaerythritol diphosphite and the like.

Specific examples of phosphate esters include triphenyl phosphate, tris(nonylphenyl)phosphate, tris(2,4-di-t-butylphenyl)phosphate, distearyl pentaerythritol diphosphate, bis(2,6-di-t-butyl-4-methylphenyl)pentaerythritol diphosphate, bis(2,4-di-t-butylphenyl)pentaerythritol diphosphate, tributyl phosphate, bisphenol A bis-diphenyl phosphate, aromatic condensed phosphate esters and the like. Examples of condensed phosphate esters include 1,3-phenylene bis(di-2,6-xylenyl phosphate), bisphenol A bis(diphenyl phosphate) and 1,3-phenylenebis(diphenylphosphate) and the like.

Specific examples of phosphonate esters include dimethyl benzenephosphonate, benzenephosphonate esters and the like.

Examples of bromine compounds include polybrominated diphenyl ethers, tetrabromobisphenol A, brominated epoxy oligomers and brominated polycarbonate oligomers.

Commercially available products can be used as a flame retardant, and examples of commercially available phosphorus flame retardants include "CR-733S", "CR-741" (both are condensed phosphate esters, liquid), "PX-200" (a condensed phosphate ester, solid) manufactured by DAIHACHI Chemical Industry Co., Ltd., "SPS-100" (a phosphazene compound, solid) manufactured by Otsuka Chemical Co., Ltd., and the like.

The flame retardants can be used alone or two or more flame retardants can be used in combination.

(Dripping Inhibitor)

A dripping inhibitor is added for the purpose of inhibiting dripping of resin materials during burning and improving flame resistance, and the dripping inhibitors include fluorine dripping inhibitors, silicone rubber, layered silicate and the like.

The above-mentioned layered silicate include smectite clay minerals such as montmorillonite, saponite, hectorite, beidellite, stevensite and nontronite, vermiculite, halloysite, swellable mica, talc and the like, and can be those in which an organic cation, a quaternary ammonium cation or a phosphonium cation is intercalated into the interlayers thereof.

Among the above-mentioned dripping inhibitors, particularly preferred are fluorine dripping inhibitors, and specific examples of fluorine dripping inhibitors include, for example, fluorine resin such as polytetrafluoroethylene, polyvinylidene fluoride and polyhexafluoropropylene, perfluoroalkane sulfonic acid alkali metal salt compounds or perfluoroalkane sulfonic acid alkaline earth metal salts such as perfluoromethane sulfonic acid sodium salt, perfluoro-n-butane sulfonic acid potassium salt, perfluoro-t-butane sulfonic acid potassium salt, perfluorooctane sulfonic acid sodium salt and perfluoro-2-ethylhexane sulfonic acid calcium salt, and the like. Among the above-mentioned fluorine dripping inhibitors, most preferred is polytetrafluoroethylene in terms of drip inhibiting properties.

The dripping inhibitors can be used alone or two or more dripping inhibitors can be used in combination.

(Toughening Agent)

The toughening agent improves the flexibility, processability, impact resistance and the like of a resin composition. The toughening agents can be used alone or two or more toughening agents can be used. The toughening agent is, for example, a resin having rubber elasticity. The toughening agent is preferably a thermoplastic elastomer including a soft segment constituted of a polymer of a monomer including butadiene, and a hard segment constituted of a polymer of a monomer having an aromatic group such as styrene. About the molecular size of the above-mentioned thermoplastic elastomer, when the molecular size is too small, for example, the impact resistance of a resin composition can decrease, and when the size is too large, the processability of a thermoplastic resin composition can decrease. From such viewpoints, for example, the weight average molecular weight of the thermoplastic elastomer is preferably 10,000 to 500,000. The weight average molecular weight of the thermoplastic elastomer can be also obtained using a well-known method such as gel permeation chromatography.

As the structure of the above-mentioned thermoplastic elastomer, for example, a core shell structure, a graft structure, a straight chain structure and a sea island structure (what is called "polymer alloy") are known. The structure of a thermoplastic elastomer can be any of them. The core shell structure includes, for example, the core which is a cross-linked rubber particle, and the shell obtained by graft-polymerization of a vinyl monomer in the presence of the core. The core is mainly constituted of a soft segment, and the shell is mainly constituted of a hard segment. The graft structure is, for example, constituted of the backbone polymer, which is either a soft segment or a hard segment, and branch polymers, which are from another one. The straight chain structure is, for example, constituted of a block copolymer by a soft segment and a hard segment. The sea island structure is, for example, constituted of islands (dispersed phase) mainly constituted of a soft segment and the sea (continuous phase) mainly constituted of a hard segment.

Examples of the above-mentioned thermoplastic elastomers include methyl methacrylate-butadiene-styrene copolymer (MBS), acrylonitrile-butadiene-styrene copolymer (ABS), styrene-butadiene-styrene copolymer (SBS), and butyl acrylate-methyl methacrylate copolymer. Among these, it is preferred that the toughening agent be one or more selected from the group consisting of MBS, ABS and SBS in terms of the compatibility properties and flame resistance of a thermoplastic resin composition, and the dispersibility of a thermoplastic elastomer in a thermoplastic resin composition.

In addition, it is preferred that the structure of MBS be a core shell structure and the amount of rubber in MBS be 50 to 80 weight % in terms of the impact resistance of a thermoplastic resin composition and the dispersibility of MBS in a thermoplastic resin composition, and the like. In addition, it is preferred that the structure of ABS be a graft structure and the amount of rubber in ABS be 10 to 55 weight % in terms of the compatibility properties and processability of a thermoplastic resin composition. In addition, it is preferred that the structure of SBS be a straight chain structure and the amount of rubber in SBS be 50 to 80 weight % in terms of the flexibility and impact resistance of a thermoplastic resin composition. The above-mentioned "amount of rubber" means the soft segment content in the above-mentioned thermoplastic elastomer.

As an example of MBS, EM500 (LG Chemical, Ltd.) is mentioned. As an example of ABS, TFX-610 (Mitsubishi Chemical Corporation) is mentioned. As an example of SBS, cariflex TRKX65S (Shell Chemical Company) is mentioned.

The toughening agents can be used alone or two or more toughening agents can be used in combination.

(Other Resin Components and Arbitrary Components)

In the step (2), other resin components and, as needed, arbitrary addition components can be added within the range in which the object of the present invention is achieved.

By adding, for example, a polyolefin such as polyethylene or polypropylene, and a polyamide such as nylon 6 or nylon 66 and the like as other resin components, the ability as a resin for molding can be improved. The content of other resin components is preferably 0.1 to 20 weight % and more preferably 1 to 10 weight % with respect to a total of 100 weight % of polycarbonate resin and polyester resin.

In addition, as arbitrary components, a compatibilizing agent is mentioned.

The compatibilizing agent is a compound having a double bond, a carboxyl group, an epoxy group, an isocyanate group or the like (a low molecular weight compound or a polymer), and one which functions as a compatibilizing agent by showing a surface active agent-like function based on a graft or block structure by reacting with one or both of polymers to which compatibility properties are imparted in the molding process step (Reference: "polymer alloy" basic and application, edited by The Society of Polymer Science, published in 1993), and includes a resin having a reactive functional group disclosed in Japanese Patent Application Laid-Open No. 2013-133369 and the like. Examples of compatibilizing agents include copolymers having a constituent unit derived from glycidyl methacrylate (GMA) such as an ethylene glycidyl methacrylate copolymer (E-GMA; the weight composition of copolymerization, e.g. E/GMA=100/6 to 12), an ethylene glycidyl methacrylate-vinyl alcohol copolymer (E-GMA-VA; the weight composition of copolymerization, e.g. E/GMA/VA=100/3 to 12/8 to 5), and an ethylene glycidyl methacrylate-methacrylate copolymer (E-GMA-MA; the weight composition of copolymerization, e.g. E/GMA/MA=100/3 to 12/30); resins into which glycidyl methacrylate is introduced, such as ethylene glycidyl methacrylate-acrylonitrile styrene (EGMA-AS; the weight composition of copolymerization, e.g. EGMA/AS=70/30), ethylene glycidyl methacrylate-polystyrene (EGMA-PS; the weight composition of copolymerization, e.g. EGMA/PS=70/30), and ethylene glycidyl methacrylate-polymethyl methacrylate (EGMA-PMMA, e.g. EGMA/PMMA=70/30); an ethylene maleic anhydride ethyl acrylate copolymer (E-MAH-EA); acid-modified polyethylene wax; a carboxylated polyethylene graft polymer, a carboxylated polypropylene graft polymer; polyisocyanate containing 5 to 30 weight % of isocyanate group and the like.

Commercially available products can be used as a compatibilizing agent, and specifically include BONDFAST E, BONDFAST 2C (manufactured by Sumitomo Chemical Co., Ltd.); REXPERL RA, REXPERL ET, REXPERL RC (manufactured by Japan Polyolefins Corporation); BONDINE (manufactured by Sumitomo Chemical Co., Ltd.); MODIPER (manufactured by NOF Corporation); Hi-WAX (APEW; manufactured by Mitsui Chemicals, Inc.); VESTANAT T1890 (manufactured by Degussa) and the like.

These compatibilizing agents can be used alone or two or more compatibilizing agents can be used in combination as needed.

Among these, the compatibilizing agent is preferably a copolymer having a constituent unit derived from glycidyl methacrylate (GMA) or a resin into which glycidyl methacrylate is introduced in terms of easily reacting with a polyester resin.

In addition, examples of other arbitrary components include cross-linking agents (e.g. phenol resin and the like), antioxidants (hindered phenol series, sulfur-containing organic compound series, phosphorus-containing organic compound series and the like), heat stabilizers (phenol series, acrylate series and the like), transesterification inhibitors (a mixture of monostearyl acid phosphate and distearyl acid phosphate and the like) ultraviolet absorbers (benzotriazole series, benzophenone series, salicylate series and the like), light stabilizers (organonickel series, hindered amine series and the like), lubricants other than the above (higher fatty acid metal salts, higher fatty acid amides and the like), phthalate esters, pigments (carbon black, titanium oxide) and dyes, antistatic agents, foaming agents and the like.

Further, other examples of arbitrary components include fillers such as metallic fiber, aramid fiber, asbestos, potassium titanate whiskers, wollastonite, glass flake, glass beads, talc, mica, clay, calcium carbonate, barium sulfate, titanium oxide and aluminum oxide. Among these, preferred are glass fiber, carbon fiber and metallic fiber, and most preferred is carbon fiber. The type of fibrous filler is not particularly limited as long as it is generally used for strengthening resins, and, for example, can be selected from the long fiber type and the short fiber type chopped strands and milled fiber and the like. In addition, the arbitrary component content is preferably 0.01 to 10 weight % and more preferably 0.1 to 5 weight % with respect to a total of 100 weight % of polycarbonate resin and polyester resin.

(Thermoplastic Resin Composition)

The thermoplastic resin composition obtained in the above-mentioned production method has high flame resistance.

The flame resistance is one of the burning resistance, and indicates the property in which the burning rate is slow but burning continues to some extent. As the evaluation of burning resistance, there are JIS, ASTM and the like, and in general, the UL standard is particularly emphasized. The UL standard is provided by "Underwriters Laboratories Inc.", USA, and is the standard evaluated by the company. In general, using a test method in which a flame is applied to a test piece provided by UL94 to confirm the burning time and the presence or absence of dripping substances, a fire retardant substance is classified into "UL94-HB", and a self-extinguishing substance is classified into any of "UL94-V2", "UL94-V1", "UL94-V0" and "UL94-5V" depending on its degree. The self-extinguishment means, among properties of flame resistance, the property in which burning continues as long as there is a fire source but fire is self-extinguished by removing the fire source.

About the materials used in various fields such as office equipment, information-telecommunications equipment, electrical and electric equipment, consumer electronics, the automobile field, and the architecture field, their parts used are generally required to have flame resistance provided in UL-94. It is preferred that the flame resistance of a thermoplastic resin composition to be obtained be equal to or higher than UL94-V1.

(Resin Molded Body)

The thermoplastic resin composition obtained in the above-mentioned production method can be molded into a resin molded body in any techniques. Examples of molding techniques include injection molding, extrusion molding, blow molding, vacuum molding, profile extrusion molding, compression molding, gas assist molding and the like. As described above, the resin composition of the present invention has high fluidity and is suitable for injection molding, and thus is preferably a resin composition for injection molding.

The resin molded bodies of a thermoplastic resin composition obtained in the above-mentioned production method can be used for electrical and electric parts, automobile parts, machine mechanism parts, housing parts of office automation equipment or home appliances and the like, and, in particular, are preferably used for cases for office automation equipment such as a printer.

DESCRIPTION OF THE PREFERRED EMBODIMENT(S)

The effects of the present invention will be described using the following examples and comparative examples. It is noted, however, that the technical scope of the present invention is not limited to only the following examples.

<Measurement Method>

(Measurement of Weight Average Molecular Weight (Mw))

A sample was measured in the range of 4 to 7 μg, and added to tetrahydrofuran (THF). Ultrasonic waves were then applied thereto for 30 minutes and a molten part was used for measurement by a GPC device. For the weight average molecular weight (Mw) (in terms of polystyrene equivalents), HLC-8120GPC and SC-8020 devices manufactured by TOSOH CORPORATION were used as GPC devices, TSK gel Super HM-H (6.0 mm ID×15 cm×2) was used as a column, and tetrahydrofuran (THF) for chromatography manufactured by Wako Pure Chemical Industries, Ltd. was used as an eluent. The experiment was performed under the experimental conditions of a flow rate of 0.6 ml/min., a sample injection rate of 10 μl and a measurement temperature of 40° C., using an RI detector. In addition, a calibration curve was created using 10 samples of "polystyrene standard samples, TSK standard": A-500, F-1, F-10, F-80, F-380, A-2500, F-4, F-40, F-128 and F-700 manufactured by TOSOH CORPORATION. In addition, the interval of data collection in the sample analysis was 300 ms.

(Endothermic Peak Temperature of Crystalline Polyester Resin and Glass Transition Temperature (Tg) of Amorphous Polyester Resin)

The endothermic peak temperature of a crystalline polyester resin and the glass transition temperature (Tg) of an amorphous polyester resin were obtained using a differential scanning calorimeter (manufactured by Shimadzu Corporation: DSC-60A) according to ASTM D3418. For the temperature correction in the detecting part in this device (DSC-60A), the melting points of indium and zinc were used, and for the correction of heat amount, the heat of melting of indium was used. An aluminum pan was used for a sample and an empty pan was set for control. The temperature was increased at a temperature increasing rate of 10° C./min, and hold at 200° C. for 5 minutes, and decreased from 200° C. to 0° C. using liquid nitrogen at −10° C./min, and hold at 0° C. for 5 minutes. The temperature was increased at 10° C./min from 0° C. to 200° C. again. An analysis was made from the endothermic curve of the second temperature increase, and the onset temperature was used as Tg for an amorphous polyester resin.

EXAMPLE 1

(1) Step (1)

Using a V type mixer, 80 parts by weight of polyethylene terephthalate resin (intrinsic viscosity [η]=0.780 dl/g, product name: DIANITE MA521H-D25, manufactured by Mitsubishi Rayon Co., Ltd.) and 20 parts by weight of PETG resin (glass transition temperature 80° C., product name: Eastar Copolyester GN-071, manufactured by Eastman Chemical Company) were dry-blended, and the mixture was dried using a vacuum dryer at 80° C. for 4 hours under reduced pressure.

The dried mixture was charged into the raw material feed opening of a biaxial kneading extruder and melt-kneaded under conditions of a cylinder temperature of 270° C. and a discharge amount of 30 kg/h. The kneaded mixture discharged from the biaxial kneading extruder was rapidly cooled by immersion into 30° C. water, and was pulverized into the pellet form with a pelletizer to obtain a polyester resin mixture. The obtained polyester resin mixture was dried using a vacuum dryer at 80° C. for 4 hours under reduced pressure.

(2) Step (2)

Using a V type mixer, 15 parts by weight of polyester resin mixture obtained in the step (1), 59.5 parts by weight of polycarbonate resin (weight average molecular weight 50,000, product name: TARFLON A-1900, manufactured by Idemitsu Kosan Co., Ltd.), 15 parts by weight of flame retardant (a condensed phosphorus compound; product name: PX-200, manufactured by DAIHACHI Chemical Industry Co., Ltd.), 0.5 parts by weight of dripping inhibitor (PTFE; product name: FA-500H, manufactured by DAIKIN INDUSTRIES, Ltd.) and 10 parts by weight of toughening agent (a 1:1 (mass ratio) mixture of MBS; product name: EM500, manufactured by LG Chemical Ltd. and ABS; product name: TFX-610, manufactured by Mitsubishi Chemical Corporation) were dry-blended.

The mixture was charged into the raw material feed opening of a biaxial kneading extruder and melt-kneaded under the conditions of a discharge amount of 30 kg/h at 250° C. at a kneading pressure of 1.0 MPa. The kneaded mixture discharged from the biaxial kneading extruder was rapidly cooled by immersion into 30° C. water, and was pulverized into the pellet form with a pelletizer to obtain a thermoplastic resin composition.

EXAMPLE 2

A thermoplastic resin composition was obtained in the same manner as in Example 1 except that the cylinder temperature in the step (1) was changed to 250° C.

EXAMPLE 3

A thermoplastic resin composition was obtained in the same manner as in Example 1 except that the cylinder temperature in the step (1) was changed to 280° C.

EXAMPLE 4

A thermoplastic resin composition was obtained in the same manner as in Example 1 except that 50 parts by weight of polyethylene terephthalate resin and 50 parts by weight of PETG resin were used in the step (1).

EXAMPLE 5

A thermoplastic resin composition was obtained in the same manner as in Example 1 except that as amorphous polyester resin, PETG resin was changed to PCTG resin (glass transition temperature 87° C., product name: Eastar Copolyester DN-001, manufactured by Eastman Chemical Company).

EXAMPLE 6

A thermoplastic resin composition was obtained in the same manner as in Example 1 except that as amorphous polyester resin, PETG resin was changed to PCTA resin (product name: Eastar AN-004, manufactured by Eastman Chemical Company).

EXAMPLE 7

A thermoplastic resin composition was obtained in the same manner as in Example 1 except that 70 parts by weight of polyethylene terephthalate resin and 30 parts by weight of PETG resin were used in the step (1) and the weight average molecular weight of the polycarbonate resin used in the step (2) was changed to 20,000 (product name: novarex 7020R, manufactured by Mitsubishi Engineering-Plastics Corporation).

EXAMPLE 8

A thermoplastic resin composition was obtained in the same manner as in Example 1 except that 70 parts by weight of polyethylene terephthalate resin and 30 parts by weight of PETG resin were used in the step (1) and the weight average molecular weight of the polycarbonate resin used in the step (2) was changed to 70,000 (product name: novarex 7027U, manufactured by Mitsubishi Engineering-Plastics Corporation).

EXAMPLE 9

A thermoplastic resin composition was obtained in the same manner as in Example 1 except that the following step (1) was performed.
(1) Step (1)
Using a V type mixer, 80 parts by weight of polyethylene terephthalate resin (product name: DIANITE MA521H-D25, manufactured by Mitsubishi Rayon Co., Ltd.) and 20 parts by weight of PETG resin (product name: Eastar Copolyester GN071, manufactured by Eastman Chemical Company) were dry-blended, and the mixture was dried using a vacuum dryer at 80° C. for 4 hours under reduced pressure.
With the dried PET and PETG mixture, 0.05 parts by weight of lanthanum(III)acetylacetonate hydrate, a metal-based catalyst, was blended using a V type mixer to obtain a pellet. The obtained pellet was charged into the raw material feed opening of a biaxial kneading extruder and melt-kneaded under the conditions of a cylinder temperature of 270° C. and a discharge amount of 30 kg/h. The kneaded mixture discharged from the biaxial kneading extruder was rapidly cooled by immersion into 30° C. water, and was pulverized into the pellet form with a pelletizer to obtain a polyester resin mixture. The obtained polyester resin mixture was dried using a vacuum dryer at 80° C. for 4 hours under reduced pressure.

EXAMPLE 10

A thermoplastic resin composition was obtained in the same manner as in Example 1 except that in the step (1), polybutylene terephthalate resin (intrinsic viscosity 1.41 dl/g, product name: TORAYCON 1100M, manufactured by TORAY INDUSTRIES, INC.) was used in place of polyethylene terephthalate resin.

EXAMPLE 11

A thermoplastic resin composition was obtained in the same manner as in Example 2 except that in the step (1), the same polybutylene terephthalate resin as in Example 10 was used in place of polyethylene terephthalate resin.

EXAMPLE 12

A thermoplastic resin composition was obtained in the same manner as in Example 3 except that in the step (1), the same polybutylene terephthalate resin as in Example 10 was used in place of polyethylene terephthalate resin.

EXAMPLE 13

A thermoplastic resin composition was obtained in the same manner as in Example 4 except that in the step (1), the same polybutylene terephthalate resin as in Example 10 was used in place of polyethylene terephthalate resin.

EXAMPLE 14

A thermoplastic resin composition was obtained in the same manner as in Example 5 except that in the step (1), the same polybutylene terephthalate resin as in Example 10 was used in place of polyethylene terephthalate resin.

EXAMPLE 15

A thermoplastic resin composition was obtained in the same manner as in Example 6 except that in the step (1), the same polybutylene terephthalate resin as in Example 10 was used in place of polyethylene terephthalate resin.

EXAMPLE 16

A thermoplastic resin composition was obtained in the same manner as in Example 7 except that in the step (1), the same polybutylene terephthalate resin as in Example 10 was used in place of polyethylene terephthalate resin.

EXAMPLE 17

A thermoplastic resin composition was obtained in the same manner as in Example 8 except that in the step (1), the same polybutylene terephthalate resin as in Example 10 was used in place of polyethylene terephthalate resin.

EXAMPLE 18

A thermoplastic resin composition was obtained in the same manner as in Example 9 except that in the step (1), the same polybutylene terephthalate resin as in Example 10 was used in place of polyethylene terephthalate resin.

COMPARATIVE EXAMPLE 1

Using a V type mixer, 80 parts by weight of polyethylene terephthalate resin (product name: DIANITE MA521H-D25, manufactured by Mitsubishi Rayon Co., Ltd.) and 20 parts by weight of PETG resin (product name: Eastar Copolyester GN071, manufactured by Eastman Chemical Company, product name: Eastar Copolyester GN071, manufactured by Eastman Chemical Company) were dry-blended, and the mixture was dried using a vacuum dryer at 80° C. for 4 hours under reduced pressure.

Using a V type mixer, 15 parts by weight of polyester resin mixture, 59.5 parts by weight of polycarbonate resin (weight average molecular weight 50,000, product name: TARFLON A-1900, manufactured by Idemitsu Kosan Co., Ltd.), 15 parts by weight of flame retardant (a condensed phosphorus compound; product name: PX-200, manufactured by DAIHACHI Chemical Industry Co., Ltd.), 0.5 parts by weight of dripping inhibitor (PTFE; product name: FA-500H, manufactured by DAIKIN INDUSTRIES, Ltd.) and 10 parts by weight of toughening agent (a 1:1 (mass ratio) mixture of MBS; product name: EM500, manufactured by LG Chemical Ltd. and ABS; product name: TFX-610, manufactured by Mitsubishi Chemical Corporation) were dry-blended.

The mixture was charged into the raw material feed opening of a biaxial kneading extruder and melt-kneaded under the conditions of a discharge amount of 30 kg/h. The kneaded mixture discharged from the biaxial kneading extruder was rapidly cooled by immersion into 30° C. water, and was pulverized into the pellet form with a pelletizer to obtain a thermoplastic resin composition.

COMPARATIVE EXAMPLE 2

A thermoplastic resin composition was obtained in the same manner as in Example 1 except that the cylinder temperature in the step (1) was changed to 240° C.

COMPARATIVE EXAMPLE 3

A thermoplastic resin composition was obtained in the same manner as in Example 1 except that the cylinder temperature in the step (1) was changed to 290° C.

COMPARATIVE EXAMPLE 4

A thermoplastic resin composition was obtained in the same manner as in Example 1 except that in the step (1), 90 parts by weight of polyethylene terephthalate resin and 10 parts by weight of PETG resin were used.

COMPARATIVE EXAMPLE 5

A thermoplastic resin composition was obtained in the same manner as in Example 1 except that in the step (1), 40 parts by weight of polyethylene terephthalate resin and 60 parts by weight of PETG resin were used.

The following evaluation was made about a thermoplastic resin composition obtained in each example and comparative example.

<Evaluation Method>
(1) Impact Resistance

A resin composition was dried at 80° C. for 4 hours, and a rectangular test piece with 100 mm×10 mm×4 mm was then molded at a cylinder preset temperature of 260° C. and a die temperature of 40° C. using an injection molding machine "J55ELII" (manufactured by The Japan Steel Works, LTD.). The Izod impact strength test was performed according to "JIS-K7110-1998" and the evaluation was made using the following evaluation standards:
⊙: 42 kJ/m² or more;
○: 32 kJ/m² or more and below 42 kJ/m²;
Δ: 6 kJ/m² or more and below 32 kJ/m² (practical); and
X: below 6 kJ/m² (practically problematic).

(2) Fluidity

A resin composition was dried at 80° C. for 4 hours, and the flow length was then evaluated using an Archimedean spiral flow test piece (path thickness 2 mm, path width 10 mm) using an injection molding machine "ROBOSHOT_S-2000i 50BP" (manufactured by FANUC CORPORATION) according to the company's own evaluation standards mentioned below. The conditions were an injection rate of 60 mm/s, a cylinder temperature of 250° C., a die temperature of 50° C., and an injection pressure of 860 MPa. A longer flow length has better fluidity:
⊙: 350 mm or more;
○: 280 mm or more and below 350 mm;
Δ: 210 mm or more and below 280 mm (practical); and
X: below 210 mm (practically problematic).

(3) Flame Resistance

A resin composition was dried at 80° C. for 4 hours, and a rectangular test piece with 100 mm×10 mm×1.6 mm was then molded using an injection molding machine (manufactured by The Japan Steel Works, LTD., J55ELII) at a cylinder preset temperature of 260° C. and a die temperature of 40° C.

The humidity of the test piece for the UL test obtained in the above-mentioned method was controlled in a thermostatic chamber at a temperature of 23° C. at a humidity of 50% for 48 hours, and the test was performed according to the UL94 test (burning test of plastic materials for parts in devices) provided by UNDERWRITERS LABORATORIES INC. (UL), USA. The UL94V is a method in which flame resistance is evaluated from after flame time and dripping properties after applying a burner flame to a test piece with a prescribed size held vertically for 10 seconds. Each test piece was evaluated according to the following evaluation standards:
○: V0;
Δ: V1; and
X: V2 or HB.

The production conditions of each example and comparative example are shown in Table 1 and the evaluation results are shown in Table 2.

TABLE 1

| | | STEP (1) | | | | |
|---|---|---|---|---|---|---|
| | CRYSTALLINE POLYESTER RESIN | AMORPHOUS POLYESTER RESIN | CATALYST | CYLINDER TEMPERATURE | CRYSTALLINE POLYESTER RESIN/AMORPHOUS POLYESTER RESIN (WEIGHT RATIO) | $\Delta H_A / \Delta H_B$ |
| EXAMPLE 1 | PET | PETG | — | 270° C. | 8/2 | 0.6 |
| EXAMPLE 2 | PET | PETG | — | 250° C. | 8/2 | 0.7 |
| EXAMPLE 3 | PET | PETG | — | 280° C. | 8/2 | 0.6 |
| EXAMPLE 4 | PET | PETG | — | 270° C. | 5/5 | 0.2 |
| EXAMPLE 5 | PET | PCTG | — | 270° C. | 8/2 | 0.6 |
| EXAMPLE 6 | PET | PCTA | — | 270° C. | 8/2 | 0.6 |

TABLE 1-continued

| | | | | | | |
|---|---|---|---|---|---|---|
| EXAMPLE 7 | PET | PETG | — | 270° C. | 7/3 | 0.5 |
| EXAMPLE 8 | PET | PETG | — | 270° C. | 7/3 | 0.5 |
| EXAMPLE 9 | PET | PETG | YES | 260° C. | 7/3 | 0.3 |
| EXAMPLE 10 | PBT | PETG | — | 270° C. | 8/2 | 0.6 |
| EXAMPLE 11 | PBT | PETG | — | 250° C. | 8/2 | 0.7 |
| EXAMPLE 12 | PBT | PETG | — | 280° C. | 8/2 | 0.6 |
| EXAMPLE 13 | PBT | PETG | — | 270° C. | 5/5 | 0.3 |
| EXAMPLE 14 | PBT | PCTG | — | 270° C. | 8/2 | 0.6 |
| EXAMPLE 15 | PBT | PCTA | — | 270° C. | 8/2 | 0.6 |
| EXAMPLE 16 | PBT | PETG | — | 270° C. | 7/3 | 0.5 |
| EXAMPLE 17 | PBT | PETG | — | 270° C. | 7/3 | 0.5 |
| EXAMPLE 18 | PBT | PETG | YES | 260° C. | 7/3 | 0.3 |
| COMPARATIVE EXAMPLE 1 | PET | PETG | — | — | 7/3 | 1.0 |
| COMPARATIVE EXAMPLE 2 | PET | PETG | — | 240° C. | 8/2 | 0.9 |
| COMPARATIVE EXAMPLE 3 | PET | PETG | — | 290° C. | 8/2 | 0.6 |
| COMPARATIVE EXAMPLE 4 | PET | PETG | — | 270° C. | 9/1 | 0.9 |
| COMPARATIVE EXAMPLE 5 | PET | PETG | — | 270° C. | 4/6 | 0.2 |

STEP (2)

BLENDED AMOUNT (PART BY WEIGHT)

| | TOUGHENING AGENT | FLAME RETARDANT | DRIPPING INHIBITOR | POLYESTER RESIN MIXTURE | PC | MOLECULAR WEIGHT OF PC |
|---|---|---|---|---|---|---|
| EXAMPLE 1 | 10 | 15 | 0.5 | 15 | 59.5 | 50000 |
| EXAMPLE 2 | 10 | 15 | 0.5 | 15 | 59.5 | 50000 |
| EXAMPLE 3 | 10 | 15 | 0.5 | 15 | 59.5 | 50000 |
| EXAMPLE 4 | 10 | 15 | 0.5 | 15 | 59.5 | 50000 |
| EXAMPLE 5 | 10 | 15 | 0.5 | 15 | 59.5 | 50000 |
| EXAMPLE 6 | 10 | 15 | 0.5 | 15 | 59.5 | 50000 |
| EXAMPLE 7 | 10 | 15 | 0.5 | 15 | 59.5 | 20000 |
| EXAMPLE 8 | 10 | 15 | 0.5 | 15 | 59.5 | 70000 |
| EXAMPLE 9 | 10 | 15 | 0.5 | 15 | 59.5 | 50000 |
| EXAMPLE 10 | 10 | 15 | 0.5 | 15 | 59.5 | 50000 |
| EXAMPLE 11 | 10 | 15 | 0.5 | 15 | 59.5 | 50000 |
| EXAMPLE 12 | 10 | 15 | 0.5 | 15 | 59.5 | 50000 |
| EXAMPLE 13 | 10 | 15 | 0.5 | 15 | 59.5 | 50000 |
| EXAMPLE 14 | 10 | 15 | 0.5 | 15 | 59.5 | 50000 |
| EXAMPLE 15 | 10 | 15 | 0.5 | 15 | 59.5 | 50000 |
| EXAMPLE 16 | 10 | 15 | 0.5 | 15 | 59.5 | 20000 |
| EXAMPLE 17 | 10 | 15 | 0.5 | 15 | 59.5 | 70000 |
| EXAMPLE 18 | 10 | 15 | 0.5 | 15 | 59.5 | 50000 |
| COMPARATIVE EXAMPLE 1 | 10 | 15 | 0.5 | 15 (MIXED PRODUCT) | 59.5 | 50000 |
| COMPARATIVE EXAMPLE 2 | 10 | 15 | 0.5 | 15 | 59.5 | 50000 |
| COMPARATIVE EXAMPLE 3 | 10 | 15 | 0.5 | 15 | 59.5 | 50000 |
| COMPARATIVE EXAMPLE 4 | 10 | 15 | 0.5 | 15 | 59.5 | 50000 |
| COMPARATIVE EXAMPLE 5 | 10 | 15 | 0.5 | 15 | 59.5 | 50000 |

TABLE 2

| | IMPACT RESISTANCE | FLUIDITY | FLAME RESISTANCE |
|---|---|---|---|
| EXAMPLE 1 | ⊙ | ○ | ○ |
| EXAMPLE 2 | ⊙ | ○ | ○ |
| EXAMPLE 3 | ⊙ | ○ | ○ |
| EXAMPLE 4 | ⊙ | ⊙ | Δ |
| EXAMPLE 5 | ⊙ | ○ | ○ |
| EXAMPLE 6 | ⊙ | ○ | ○ |
| EXAMPLE 7 | Δ | ⊙ | ○ |
| EXAMPLE 8 | ⊙ | Δ | ○ |
| EXAMPLE 9 | ○ | ⊙ | ○ |
| EXAMPLE 10 | ⊙ | ○ | ○ |
| EXAMPLE 11 | ⊙ | ○ | ○ |
| EXAMPLE 12 | ⊙ | ○ | ○ |
| EXAMPLE 13 | ⊙ | ⊙ | Δ |
| EXAMPLE 14 | ⊙ | ○ | ○ |
| EXAMPLE 15 | ⊙ | ○ | ○ |
| EXAMPLE 16 | Δ | ⊙ | ○ |
| EXAMPLE 17 | ⊙ | Δ | ○ |
| EXAMPLE 18 | ○ | ⊙ | ○ |
| COMPARATIVE EXAMPLE 1 | ⊙ | X | ○ |
| COMPARATIVE EXAMPLE 2 | ○ | X | ○ |
| COMPARATIVE EXAMPLE 3 | X | ⊙ | Δ |

TABLE 2-continued

|  | IMPACT RESISTANCE | FLUIDITY | FLAME RESISTANCE |
|---|---|---|---|
| COMPARATIVE EXAMPLE 4 | ⊙ | X | ○ |
| COMPARATIVE EXAMPLE 5 | ⊙ | ○ | X |

The thermoplastic resin compositions in Examples 1 to 18 in the present invention had the evaluation of more than Δ in all items of impact resistant degree, fluidity and flame resistance, which showed that the physical properties of all items were excellent.

On the other hand, when a crystalline polyester resin and an amorphous polyester resin were not melt-kneaded in the step (1) (Comparative Example 1), the temperature during melt-kneading was low in the step (1) (Comparative Example 2), and the ratio of the crystalline polyester resin content was high in the step (1) (Comparative Example 4), fluidity worsened. In addition, when the temperature during melt-kneading was high in the step (1) (Comparative Example 3), impact resistance decreased, and when the ratio of the amorphous polyester resin content was high in the step (1) (Comparative Example 5), flame resistance decreased.

The suitable embodiments of the present invention were described as above. It is noted, however, that these are presented for the illustration purpose of the present invention and the scope of the present invention is not limited to only these embodiments. The present invention can be performed in various modes different from the above-mentioned embodiments without departing from the gist of the invention.

The present application is based on Japanese Patent Application No. 2013-238115 filed on Nov. 18, 2013, and its disclosure is incorporated herein by reference in its entirety.

What is claimed is:

1. A method for producing a thermoplastic resin composition comprising: the step (1) of obtaining a polyester resin mixture by melt-kneading 50 to 80 parts by weight of crystalline polyester resin and 20 to 50 parts by weight of amorphous polyester resin with an extruder; and the step (2) of mixing the polyester resin mixture, polycarbonate resin, a flame retardant, a dripping inhibitor and a toughening agent, wherein the cylinder temperature of the extruder is 250 to 280° C., wherein the amount of heat release ($\Delta H_A$) in the DSC melting curve of the polyester resin mixture is 70% or less with respect to the amount of heat release ($\Delta H_B$) in the DSC melting curve of the crystalline polyester resin ($\Delta H_A/\Delta H_B \leq 0.7$).

2. The production method according to claim 1, wherein the crystalline polyester resin is at least one kind of polyethylene terephthalate and polybutylene terephthalate, and the amorphous polyester resin is at least one kind of PETG resin, PCTG resin and PCTA resin.

3. The production method according to claim 1, wherein in the step (1), a metal-based catalyst is added in an amount of 0.05 weight % or less with respect to a total of 100 weight % of the crystalline polyester resin and the amorphous polyester resin.

4. The production method according to claim 1, wherein in the step (2), 10 to 90 parts by weight of polyester resin mixture, 10 to 90 parts by weight of polycarbonate resin, 1 to 40 parts by weight of flame retardant, 0.1 to 1 part by weight of dripping inhibitor and 1 to 20 parts by weight of toughening agent are mixed.

5. The production method according to claim 1, wherein the molecular weight (Mw) of the polycarbonate resin is 20,000 to 70,000.

* * * * *